(12) United States Patent
Tanaka

(10) Patent No.: US 10,254,506 B2
(45) Date of Patent: Apr. 9, 2019

(54) LENS APPARATUS AND IMAGE PICKUP APPARATUS

(71) Applicant: CANON KABUSHIKI KAISHA, Tokyo (JP)

(72) Inventor: Yuhei Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 15/290,548

(22) Filed: Oct. 11, 2016

(65) Prior Publication Data

US 2017/0115467 A1    Apr. 27, 2017

(30) Foreign Application Priority Data

Oct. 23, 2015 (JP) .................... 2015-208977

(51) Int. Cl.
| | |
|---|---|
| G02B 7/10 | (2006.01) |
| G02B 7/02 | (2006.01) |
| G02B 15/16 | (2006.01) |
| G03B 13/10 | (2006.01) |

(52) U.S. Cl.
CPC .............. *G02B 7/10* (2013.01); *G02B 7/026* (2013.01); *G02B 15/16* (2013.01); *G03B 13/10* (2013.01)

(58) Field of Classification Search
CPC .......... G02B 7/10; G02B 7/026; G02B 15/16; G02B 7/102; G02B 7/105; G03B 13/10
USPC .................... 359/699–701; 348/335; 396/55, 396/342–343
See application file for complete search history.

(56) References Cited

U.S. PATENT DOCUMENTS

| | | | | |
|---|---|---|---|---|
| 5,754,896 | A | * | 5/1998 | Aoki ........................ G03B 3/00 396/144 |
| 6,104,551 | A | | 8/2000 | Matsui |
| 6,147,814 | A | * | 11/2000 | Kitazawa ................ G02B 7/10 359/699 |
| 6,937,817 | B2 | | 8/2005 | Yasuda |

FOREIGN PATENT DOCUMENTS

| | | |
|---|---|---|
| JP | H1010397 A | 1/1998 |
| JP | H11326734 A | 11/1999 |
| JP | 2003279836 A | 10/2003 |
| JP | 2004258195 A | 9/2004 |
| JP | 2009204640 A | 9/2009 |
| JP | 2010066633 A | 3/2010 |

OTHER PUBLICATIONS

Office Action issued in Japanese Appln. No. 2015-208977 dated Jan. 30, 2018.

* cited by examiner

*Primary Examiner* — Kristina M Deherrera
(74) *Attorney, Agent, or Firm* — Rossi, Kimms & McDowell LLP

(57) ABSTRACT

A lens apparatus of the present invention includes an optical unit that moves integrally in a direction of an optical axis and a biasing unit that applies a first force and a second force to the optical unit at different positions around the optical axis. In the lens apparatus, a direction of a component of the first force in the optical axis direction and a direction of a component of the second force in the optical axis direction are opposite to each other.

13 Claims, 3 Drawing Sheets

LENS APPARATUS AND IMAGE PICKUP APPARATUS

BACKGROUND OF THE INVENTION

Field of the Invention

The present invention relates to a lens driving mechanism in a lens apparatus, and particularly to a lens apparatus, as well as an image pickup apparatus having the lens apparatus, which varies its focal length or image location by driving multiple optical elements relative to one another.

Description of the Related Art

A conventionally-known lens apparatus includes a cam mechanism and optical elements such as a lens support frame that supports lenses and an aperture device that adjusts the amount of light, and performs zooming, focusing, and light amount adjustment by using the cam mechanism to move the optical elements relative to one another in a direction of an optical axis. In a typical cam mechanism, cam grooves are formed on an inner circumferential surface of a moving barrel, and cam pins are attached to the ions support frame to engage with the cam grooves. Rotating the moving barrel moves the lens support frame inside the moving barrel forward and backward along the cam grooves. Since there is a play between each cam groove and its corresponding cam pin, the tilting (direction and angle) of the lens support frame varies depending on the direction in which the moving barrel is rotated. There is therefore an increasing demand especially for a lens apparatus required to have high definition in peripheral resolution to include a structure for biasing the lens support frame in a certain one of its moving directions to retain the tilting of the lens support frame even when the moving barrel is rotated in the opposite direction (referred to as reverse rotation below). The following structure has been disclosed as a structure for retaining the tilting of the lens support frame even in the reverse rotation.

In a lens tilt reduction structure disclosed in Japanese Patent Application Publication No. H11-326734, multiple spring members are provided between two zoom lens units to apply biasing forces evenly to the cam pins of each zoom lens unit. Backlash between the cam grooves and the cam pins is thereby reduced.

In a case of a lens support frame for a heavy lens, the spring members need to apply large biasing forces to retain the tilt direction of the lens support frame in the reverse rotation. Such increased biasing forces, however, increase the kinetic frictions generated between the cam grooves and the cam pins sliding therein. In other words, a large torque is necessary to turn an operation ring provided around a lens barrel to move the moving barrel in the optical axis direction.

SUMMARY OF THE INVENTION

The present invention has an object to provide a lens apparatus capable of causing a lens support frame to tilt always in a certain direction, irrespective of the direction in which a moving barrel is rotated to move a moving lens unit, without increasing torque necessary for the rotation of the moving barrel.

To achieve the above object, a lens apparatus of the present invention includes an optical unit that moves integrally in a direction of an optical axis and a biasing unit that applies a first force and a second force to the optical unit at different positions around the optical axis. In the lens apparatus, a direction of a component of the first force in the optical axis direction and a direction of a component of the second force in the optical axis direction are opposite to each other.

The present invention can provide a lens apparatus capable of retaining the orientation of a lens support frame tilted in a certain direction, irrespective of the direction in which a moving barrel is rotated to move a moving lens unit, without increasing torque necessary for the rotation of the moving barrel.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
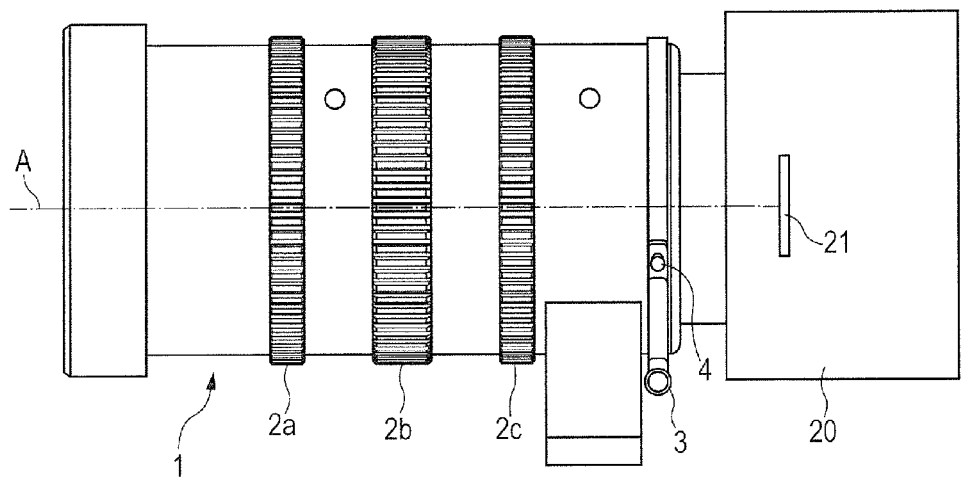
FIG. 1 is a diagram showing the overall configuration of a zoom lens system.
Figure 2:
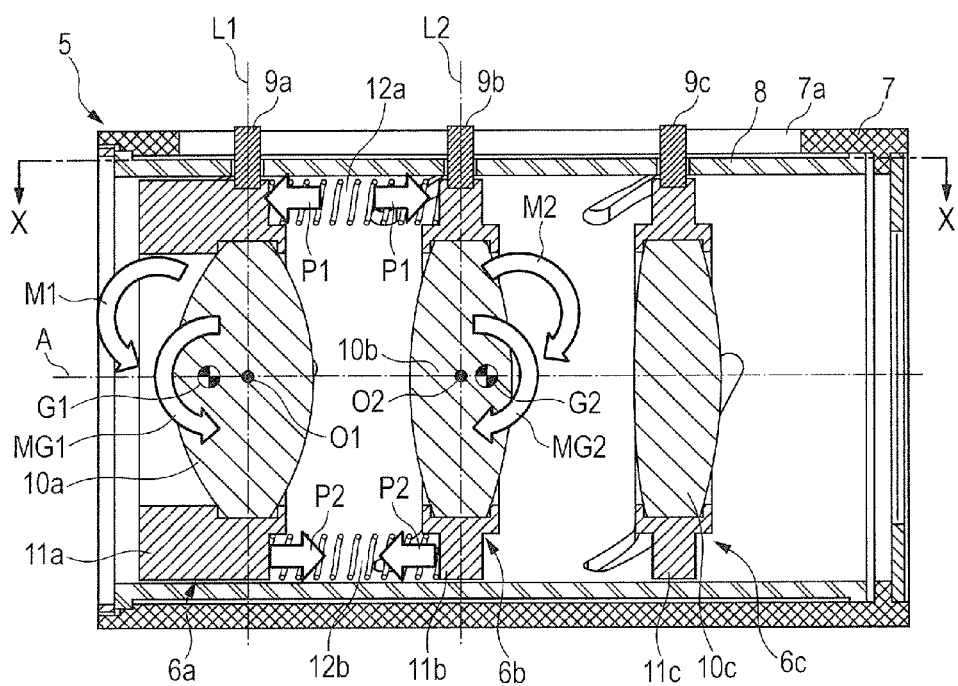
FIG. 2 is a detailed view of a lens tilt retention structure according to Embodiment 1 of the present invention.
Figure 3:
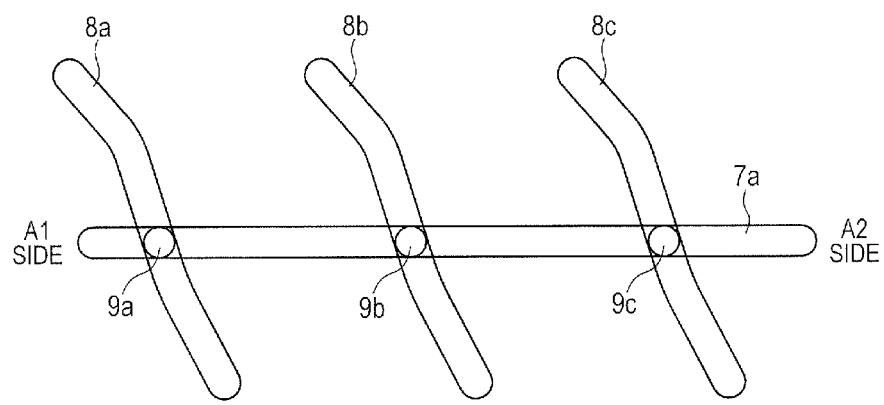
FIG. 3 is a sectional view of the lens tilt retention structure according to Embodiment 1 of the present invention, taken along line X-X in FIG. 2.

FIG. 1 is a diagram showing the overall configuration of a zoom lens system, FIG. 2 is a detailed view of a lens tilt retention (keeping, maintaining) structure according to Embodiment 1 of the present invention, and FIG. 3 is a sectional view of the lens tilt retention structure according to Embodiment 1 of the present invention, taken along line X-X in FIG. 2.

The overall configuration of the zoom lens system of the present embodiment is described with reference to FIG. 1. In a lens apparatus 1, focusing is performed when a focus ring 2a is turned to move a moving optical unit (not shown) in a direction of an optical axis A to a position corresponding to the turn angle of the focus ring 2a. Zooming is performed when a zoom ring 2b is turned to move a moving optical unit (not shown) in the direction of the optical axis A to a position corresponding to the turn angle of the zoom ring 2b. The amount of light is adjusted when an iris ring 2c is turned to vary the aperture diameter in accordance with the turn angle of the iris ring 2c. In addition, the focusing distance between the lens apparatus 1 and an image pickup element 21 of a camera apparatus 20 connected to the lens apparatus 1 is adjusted when a flange-back adjustment ring 3 or a macro ring 4 is turned to move a moving optical unit (not shown) in the direction of the optical axis A. An image pickup apparatus includes the lens apparatus 1 of the present invention and the camera apparatus 20 having the image pickup element 21 that receives object light from the lens apparatus 1.

The above is the overall configuration of the zoom lens system.

Next, a cam mechanism part 5 (a driving mechanism), which is an internal structure of the lens apparatus 1, is described with reference to FIGS. 2 and 3. The cam mechanism part 5 employs a cam structure including a lens barrel 7 (a fixed lens barrel) having straight grooves 7a extending in the optical axis direction, a moving barrel 8 (a cam member) having cam grooves 8a, cam grooves 8b, and cam grooves 8c, and cam pins 9a, cam pins 9b, and cam pins 9c (cam followers). Each moving optical unit 6a, 6b, 6c consists of a lens unit 10a, 10b, 10c and a lens support frame 11a, 11b, 11c (a moving lens barrel) that supports the lens unit. The moving barrel 8 is rotatable relative to the lens barrel 7 about the optical axis A, and rotation of the moving barrel 8 determines the positions of the lens units 10a, 10b, 10c in the optical axis direction. The cam pins 9a, 9b, 9c are provided to the lens support frames 11a, 11b, 11c at positions around the optical axis A and engage with the corresponding cam grooves 8a, 8b, 8c of the moving barrel 8 and the corresponding straight grooves 7a of the lens barrel 7. When the moving barrel 3 is rotated relative to the lens barrel 7, the lens support frames 11a, 11b, 11c do not rotate relative to the lens barrel 7 because the cam pins 9a, 9b, 9c are in engagement with the straight grooves 7a, and move in the optical axis direction by following the shapes of the cam grooves 8a, 8b, 8c. The cam pins 9a, 9b, or 9c, the cam grooves 8a, 8b, or 8c, and the straight grooves 7a are provided at three positions around the optical axis A which are substantially equally spaced, so as to retain the orientation of the movable optical unit 6a, 6b, 6c.

The above is the configuration of the cam mechanism part 5.

Next, the configuration of a lens tilt retention structure provided to the cam mechanism part 5 is described below using FIG. 2. As biasing members, spring members 12a, 12b are provided between the lens support frames 11a, 11b. The spring member 12a is a compression spring (a compression elastic member), and the spring member 12b is a tensile spring (tensile elastic member).

The spring members 12a, 12b bias the lens support frames 11a, 11b, to which they are connected, at their respective positions in different directions. The spring members 12a, 12b are provided at, preferably but not necessarily, positions opposite from each other across the optical axis A. In the present embodiment, the circumferential positions of the spring members 12a, 12b around the optical axis A are as follows: the spring member 12a is placed at a position where one of the cam pins 9a (9b) (referred to as a first cam pin) is located, and the spring member 12b is placed at a position between the other two of the cam pins 9a (9b) (referred to as a second cam pin and a third cam pin) which are not shown in the sectional view in FIG. 2. As a result, the first cam pin 9a is biased to an A1-side side wall of its corresponding cam groove 8a in FIG. 3, and the first cam pin 9b is biased to an A2-side side wall of its corresponding cam groove 8b in FIG. 3. Meanwhile, the second and third cam pins 9a are biased to A2-side side walls of their corresponding cam grooves 8a, and the second and third cam pins 9b are biased to A1-side side walls of their corresponding cam grooves 8b. In other words, wherever the lens support frame (an optical unit) is positioned in the optical axis direction, the spring members 12a, 12b, which are biasing means (a biasing unit), bias each lens support frame 11a, 11b at different circumferential positions around the optical axis A in opposite directions along the optical axis A. This configuration can reduce variation in the tilting of the lens support frame 11a, 11b, which is caused by plays between the cam pins 9a, 9b for the moving optical units 6a, 6b and the cam grooves 8a, 8b with which the cam pins 9a, 9b engage, and can therefore retain the tilting of the lens support frame 11a, 11b in its certain direction.

All the cam pins for each lens support frame that move along the corresponding cam grooves are each thus kept being biased to the same, certain side wall of the corresponding cam groove. Thereby, irrespective of the direction in which the lens support frame moves, the lens support frame does not change in its tilt direction, retaining a stable orientation. Variations in the orientation of a movable lens greatly affect optical performance. Thus, when the orientation of a movable lens is stabilized as described above irrespective of its position in the optical axis direction, optical performance can be prevented from being varied and degraded. Furthermore, the directions in which the cam pins for one lens support frame are biased to the side walls of the cam grooves are fixed for each of the cam pins, but are not the same among the cam pins. Such a configuration prevents elastic forces of the spring members from moving the lens support frame in the optical direction without a driving operation. The above configuration also allows the lens support frame to be driven stably with less power consumption because the driving force does not change depending on the direction in which the lens support frame is driven. As described in the above, a plurality of cam pins are provided (engaged) to each of the lens support frames (11a, 11b, 11c) in the present embodiment. In the constitution, the biasing forces are applied to the single lens support frame roughly at the upper end (vertically upper than the optical axis) and roughly at the lower end (vertically lower than the optical axis) and the directions of the biasing forces are opposite to each other. With this configuration, the lens supporting frame (or the lens) is caused to be tilted. However, the lens support frame (or lens) is not necessarily to be tiled but may be vertical (vertical to the optical axis). Moreover, each of the lens support frames is engaged with cam grooves at three positions and the biasing forces are applied to the lens support frame at two positions in the present embodiment. However, the present invention is not limited to such a configuration. Each of the lens support frames may be engaged with cam grooves at three positions and the biasing forces may be applied to the lens support frame at three positions. And further modification can be appropriately applied. This is also applicable to the other embodiments.

The circumferential positions around the optical axis A at which the spring members 12a, 12b apply biasing forces (P1, P2) to the lens support frames are determined considering directions in which the moving optical units 6a, 6b tend to tilt. To be more specific, the circumferential positions at which the spring members 12a, 12b apply biasing forces (P1, P2) to the lens support frame are desirably determined considering, based on the in-use orientation of the lens apparatus 1, the center of gravity of the part driven by the lens support frame, the support plane of the lens support frame, and the direction of gravity. In the present embodiment in which the lens apparatus 1 is often used with its optical axis being horizontal, the biasing directions are determined as follows. In the lens support frame 11a, a moment MG1 is generated as shown in FIG. 2 by the relations among the center of gravity G1 of the entire moving unit, a plane L1 passing through the centers of the cam pins 9a and being perpendicular to the optical axis A, and the direction of gravity, which is in this case perpendicular to the optical axis A (the moving direction of the lens support frame 11a). In the lens support frame 11b, similarly, a moment MG2 is generated as shown in FIG. 2 by the relations among the center of gravity G2 of the entire moving unit, a plane L2 passing through the centers of the cam pins 9b and being perpendicular to the optical axis A, and the direction of gravity, which is in this case perpendicular to the optical axis A. Thus, desirably, the biasing directions for the lens support frames 11a, 11b are determined so that moments M1, M2 applied by the spring members 12a, 12b to the lens support frames 11a, 11b may have the same directions as the gravitational moments MG1, MG2, respectively.

In the lens apparatus of the present invention, the biasing directions of the spring members do not necessarily have to be determined based on the above relations. The gist of the present invention is that the directions in which the cam pins for one lens support frame are biased to the side walls of the corresponding cam grooves are fixed for each of the cam pins irrespective of the position of the lens support frame, but are not the same among the cam pins. Thus, when the spring members are to bias the lens support frames for two movable lenses having different directions of moments generated by gravity on the driven units including the movable lenses, the biasing forces desirably generate moments in the same directions as the respective different directions of the moments. Since the moment of the biasing force generated by each spring member and the moment generated by gravity do not cancel out each other, an elastic force necessary for the spring member can be reduced. This allows reduction in, e.g., the number of turns and length of the spring member to be used, achieving size reduction and space saving. However, the moments by gravity and the moments by the spring members do not necessarily have to coincide with each other in direction as long as the spring members can apply forces that allow the lens support frames to retain the orientations tilted in certain directions.

Although the spring members 12a, 12b are placed between the moving optical units 6a, 6b in the present embodiment, the present invention is not limited to such a configuration. The spring members 12a, 12b may be placed between one moving optical unit and one fixed optical unit (a fixed unit). The tilting of the moving optical unit can still be stabilized in such a configuration, and the advantageous effects of the present invention can be produced.

In addition, an optical adjustment mechanism (not shown) may be provided to adjust the influence of the moving optical units 6a, 6b tilted in the present embodiment on the optical performance of the lens apparatus. For example, the optical adjustment mechanism may adjust the position (in the optical axis direction or on the plane perpendicular to the optical axis), tilt, and the like of a lens relative its lens support frame. The optical adjustment mechanism, enables easy optical adjustment even when the moving optical units 6a, 6b are tilted.

Embodiment 2

Figure 4:
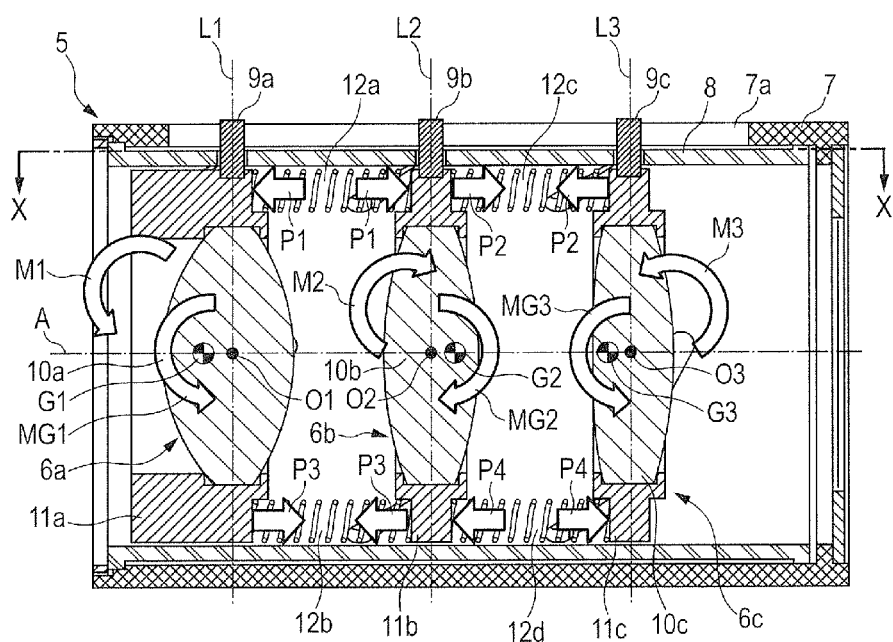
FIG. 4 is a detailed view of a lens tilt retention structure according to Embodiment 2 of the present invention.

A lens apparatus according to Embodiment 2 is described with reference to FIG. 4.

The overall configuration of the lens apparatus of the present embodiment as a zoom lens is the same as that of Embodiment 1 described with reference to FIG. 1, and is therefore not described below. The same components as those in Embodiment 1 are denoted by the same reference signs as those used in Embodiment 1 to omit descriptions thereof.

Although the spring members apply biasing forces to the two moving optical units 6a, 6b in Embodiment 1, three or more moving optical units 6a, 6b, 6c may be biased. The present embodiment describes a configuration for biasing the three moving optical units 6a, 6b, 6c and advantageous effects produced by such a configuration. The moving optical unit 6c consists of the lens unit 10c and the lens support frame 11c that supports the lens unit 10c, and the position of the lens unit 10c in the optical axis A direction is determined by rotation of the moving barrel 8 relative to the lens barrel 7. An intersection of the optical axis A and plane L3 passing through the centers, in the optical axis A direction, of the cam pins 9c for the moving optical unit 6c is referred to as a tilt center O3. The spring member 12a which is a compression spring (a compression elastic member) and the spring member 12b which is a tensile spring (a tensile elastic member) are provided between the lens support frames 11a, 11b. A spring member 12c which is a tensile spring and a spring member 12d which is a compression spring are provided between the lens support frames 11b, 11c. The spring members 12a, 12b, 12c, 12d are provided at circumferential portions around the optical axis A to correspond to the directions in which the movable optical units 6a, 6b, 6c tend to tilt. In other words, the spring members are placed in such a manner as to generate moments in the same directions as moments MG1, MG2, MG3 generated by the relations between the centers of gravity G1, G2, G3 of the lens support frames 11a, 11b, 11c and the planes L1, L2, L3 passing through the centers of the corresponding cam pins and being perpendicular to the optical axis A. In other words, it is preferable that the spring members be placed to generate moments in the same directions as the directions in which the lens support frames are urged to rotate by gravity. The spring members 12a, 12b, 12c, 12d thus apply biasing forces P1, P2, P3 to the moving optical units 6a, 6b, 6c. In this event, the lens support frame 11a receives a moment M1 from the spring members 12a, 12b about the tilt center O1, and similarly, the lens support frames 11b, 11c receive moments M2, M3 generated about the tilt centers O2, O3, respectively. Thereby, the moving optical units 6a, 6b, 6c tilt in the directions of the moments M1, M2, M3 generated around the tilt centers O1, O2, O3, respectively. How much each moving optical unit 6a, 6b, 6c tilts is determined by plays between their cam pins 9a, 9b, or 9c and the cam grooves 8a, 8b, or 8c with which the cam pins 9a, 9b, or 9c engage. The lens support frames 11a, 11b, to which the spring members 12a, 12b are connected, have the moments M1, M2 generated in opposite directions from each other. Similarly, the lens support frames 11b, 11c, to which the spring members 12c, 12d are connected, have the moments M2, M3 generated in opposite directions from each other, as well. The lens support frame 11b receives forces of the same direction from the spring members 12a, 12c, and receives forces of the same direction from the spring members 12b, 12d.

In this manner, the present invention is also applicable to three or more moving optical units and can keep the lenses tilted in their certain directions even when the lenses are moved. Since the tilting of each movable optical member, which sensitively affects optical performance of the lens apparatus, is thus retained, variations in the optical performance of the lens apparatus are reduced to maintain stable optical performance.

Embodiment 3

A lens apparatus according to Embodiment 3 is described with reference to FIG. 5.

The overall configuration of the lens apparatus of the present embodiment as a zoom lens is the same as that of Embodiment 1 described with reference to FIG. 1, and is therefore not described below.

Figure 5:
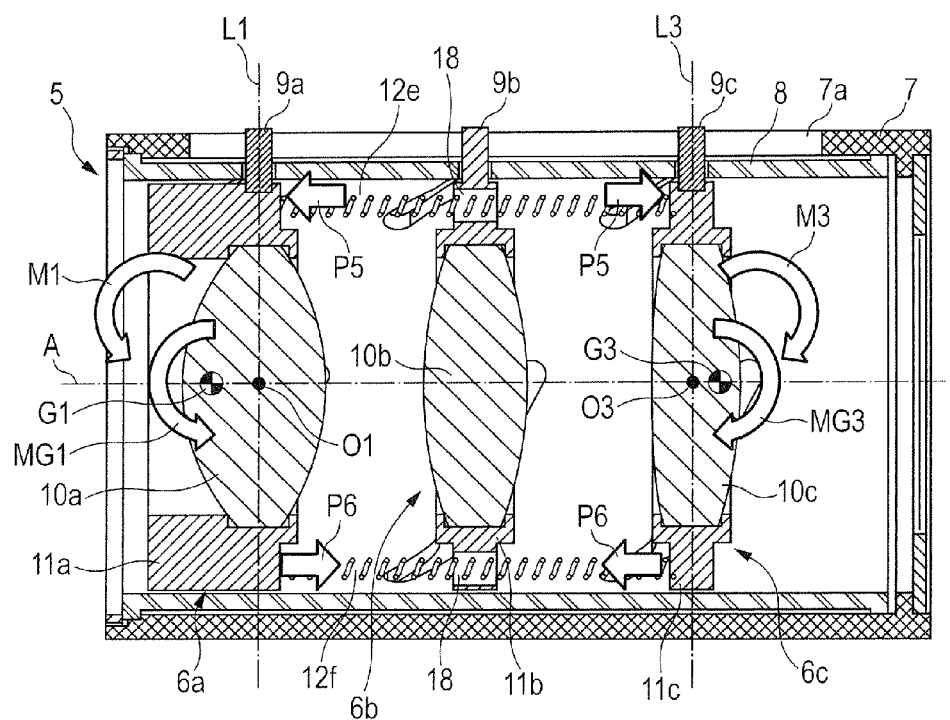
FIG. 5 is a detailed view of a lens tilt retention structure according to Embodiment 3 of the present invention.

FIG. 5 is a detailed view of the lens apparatus according to Embodiment 3 of the present invention, the lens apparatus having a lens tilt retention structure.

The lens apparatus of the present embodiment is similar to that of Embodiment 1, but is different in that the lens support frames, each tilting of which is to be retained by spring members, are not next to each other, with a movable optical member being interposed between them.

The same components as those in Embodiment 1 are denoted by the same reference signs as those used in Embodiment 1 to omit descriptions thereof, and only parts different from Embodiment 1 are described below.

The configuration of the lens tilt retention structure provided to the cam mechanism part 5 is described below using FIG. 5. As biasing members, a spring member 12e which is a compression spring and a spring member 12f which is a tensile spring are provided between the lens support frames 11a, 11c. To avoid interference of the spring members 12e, 12f, the lens support frame 1ib is provided with cut-outs 18 which are penetration portions penetrating in the optical axis direction. Passing through the cut-outs 18, the spring members 12e, 12f are connected to the lens support-frames 11a, 11e.

The spring members 12e, 12f bias the lens support frames 11a, 11c, to which they are connected, at their respective positions in different directions. The spring members 12e, 12f are provided at, preferably but not necessarily, positions opposite from each other circumferentially across the optical axis A. In the present embodiment, the circumferential positions of the spring members 12e, 12f around the optical axis A are as follows: the spring member 12e is placed at a position where one of the cam pins 9a (9c) (referred to as a first cam pin) is located, and the spring member 12f is placed at a position between the other two of the cam pins 9a (9c) (referred to as a second cam pin and a third cam pin) which are not shown in the sectional view in FIG. 5. As a result, the first cam pin 9a is biased to an A1-side side wall of its corresponding cam groove 8a in FIG. 3, and the first cam pin 9c is biased to an A2-side side wall of its corresponding cam groove 8b in FIG. 3. Meanwhile, the second and third cam pins 9a are biased to A2-side side walls of their corresponding cam grooves 8a, and the second and third cam pins 9c are biased to A1-side side walls of their corresponding cam grooves 8b. This configuration can reduce variation in the tilting of each lens support frame 11a, 11c, which is caused by plays between the cam pins 9a, 9c for the moving optical units 6a, 6c and the cam grooves 8a, 8b with which the cam pins 9a, 9c engage, and can therefore retain the tilting of the lens support frame 11a, 11e in its certain direction.

All the cam pins for each lens support frame that move along the corresponding cam grooves are each thus kept being biased to the same, certain side wall of the corresponding cam groove. Thereby, irrespective of the direction in which the lens support frame moves, the lens support frame does not change in its tilt direction, retaining a stable orientation. Variations in the orientation of a movable lens greatly affect optical performance. Thus, when the orientation of a movable lens is stabilized as described above irrespective of its position in the optical axis direction, optical performance can be prevented from being varied and degraded. Furthermore, the directions in which the cam pins for one lens support frame are biased to the side walls of the cam grooves are fixed for each of the cam pins, but are not the same among the cam pins. Such a configuration prevents elastic forces of the spring members from moving the lens support frame in the optical direction without a driving operation. The above configuration also allows the lens support frame to be driven stably with less power consumption because the driving force does not change depending on the direction in which the lens support frame is driven.

The circumferential positions around the optical axis A at which the spring members 12e, 12f apply biasing forces (P5, P6) to the lens support frames are determined considering directions in which the moving optical units 6a, 6c tend to tilt. To be more specific, the circumferential positions at which the spring members 12e, 12f apply biasing forces (P5, P6) to the lens support frame are desirably determined considering, based on the in-use orientation of the lens apparatus 1, the center of gravity of the part driven by the lens support frame, the support plane of the lens support frame, and the direction of gravity. In the present embodiment in which the lens apparatus 1 is often used with its optical axis being horizontal, the biasing directions are determined as follows. In the lens support frame 11a, a moment MG1 is generated as shown in FIG. 5 by the relations among the center of gravity G1 of the entire moving unit, a plane L1 passing through the centers of the cam pins 9a and being perpendicular to the optical axis A, and the direction of gravity, which is in this case perpendicular to the optical axis A (the moving direction of the lens support frame 11a). In the lens support frame 11b, similarly, a moment MG3 is generated as shown in FIG. 5 by the relations among the center of gravity G2 of the entire moving unit, a plane L3 passing through the centers of the cam pins 9c and being perpendicular to the optical axis A, and the direction of gravity, which is in this case perpendicular to the optical axis A. Thus, desirably, the biasing directions for the lens support frames 11a, 11c are determined so that moments M1, M3 applied by the spring members 12e, 12f to the lens support frames 11a, 11c may have the same directions as the gravitational moments MG1, MG3, respectively.

In the lens apparatus of the present invention, the biasing directions of the spring members do not necessarily have to be determined based on the above relations. The gist of the present invention is that the directions in which the cam pins for one lens support frame are biased to the side walls of the corresponding cam grooves are fixed for each of the cans pins irrespective of the position of the lens support frame, but are not the same among the cam pins. Thus, when the spring members are to bias the lens support frames for two movable lenses having different directions of moments generated by gravity on the driven units including the movable lenses, the biasing forces desirably generate moments in the same directions as the respective different directions of the moments. Since the moment of the biasing force generated by each spring member and the moment generated by gravity do not cancel out each other, an elastic force necessary for the spring member can be reduced. This allows reduction in, e.g., the number of tarns and length of the spring member to be used, achieving size reduction and space saving. However, the moments by gravity and the moments by the spring members do not necessarily have to coincide with each other in direction as long as the spring members can apply forces that allow the lens support frames to retain the orientations tilted in certain directions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-208977, filed Oct. 23, 2015, which is hereby incorporated by reference herein in its entirety.

What is claimed is:

1. A lens apparatus comprising:
an optical unit configured to be moved in a direction of an optical axis thereof;
a driving mechanism configured to move the optical unit in the direction; and
a biasing unit configured to respectively apply a first force and a second force to the optical unit at two positions thereof different from each other around the optical axis,
wherein
a component of the first force in the direction and a component of the second force in the direction have respective two directions opposite to each other, and
the biasing unit is configured to apply the first force and the second force to the optical unit such that, in a state where the optical axis is horizontal, the biasing unit applies, to the optical unit, a moment whose direction is same as a direction of a moment applied to the optical unit by a positional relation between a center of gravity of the optical unit and an intersection of the optical axis and a plane orthogonal to the optical axis and passing through a center of an engagement member in the optical unit engaged with the driving mechanism.

2. The lens apparatus according to claim 1, wherein irrespective of a position of the optical unit in the direction, each of the two component force directions is constant.

3. The lens apparatus according to claim 1, wherein a position of the optical unit at which the first force is applied and a position of the optical unit at which the second force is applied are opposite to each other with respect to the optical axis.

4. The lens apparatus according to claim 1, wherein the first force is generated by a first elastic member being compressed, and
the second force is generated by a second elastic member being extended.

5. The lens apparatus according to claim 1, wherein the optical unit is moved for zooming or focusing.

6. The lens apparatus according to claim 1, wherein the apparatus includes two optical units, and
the biasing unit includes a compression elastic member and a tensile elastic member which are placed between the two optical units and connected to the two optical units.

7. The lens apparatus according to claim 6, further comprising another optical unit on the optical axis between the two optical units.

8. The lens apparatus according to claim 1, wherein the biasing unit includes a compression spring and a tensile spring.

9. The lens apparatus according to claim 1, wherein the driving mechanism includes
a fixed lens barrel having straight grooves extending in the direction, and
a cam member being rotatable about the optical axis relative to the fixed lens barrel and having cam grooves which determine a position of the optical unit in accordance with a rotational angle of the cam member.

10. The lens apparatus according to claim 9, wherein the optical unit includes cam followers being placed at respective positions, around the optical axis, on a barrel of the optical unit, and respectively engaged with the straight grooves and the cam grooves.

11. The lens apparatus according to claim 1, wherein in a direction of gravity and in the state where the optical axis is horizontal,
a position of the optical unit at which the first force is applied and a position of the optical unit at which the second force is applied are opposite to each other with respect to the optical axis.

12. The lens apparatus according to claim 1, wherein in a direction of gravity and in the state where the optical axis is horizontal,
a position of the optical unit at which the first force is applied is above the optical axis, and
a position of the optical unit at which the second force is applied is below the optical axis.

13. An image pickup apparatus comprising:
a lens apparatus comprising:
an optical unit configured to be moved in a direction of an optical axis thereof;
a driving mechanism configured to move the optical unit in the direction; and
a biasing unit configured to respectively apply a first force and a second force to the optical unit at two positions thereof different from each other around the optical axis,
wherein
a component of the first force in the direction and a component of the second force in the direction have respective two directions opposite to each other, and
the biasing unit is configured to apply the first force and the second force to the optical unit such that, in a state where the optical axis is horizontal, the biasing unit applies, to the optical unit, a moment whose direction is same as a direction of a moment applied to the optical unit by a positional relation between a center of gravity of the optical unit and an intersection of the optical axis and a plane orthogonal to the optical axis and passing through a center of an engagement member in the optical unit engaged with the driving mechanism, and
an image pickup element configured to receive light from the lens apparatus.

* * * * *